(12) United States Patent
Damiani et al.

(10) Patent No.: US 11,900,134 B2
(45) Date of Patent: Feb. 13, 2024

(54) ASSISTANCE TO A DRIVER OF A MOBILITY VEHICLE FOR LEARNING FEATURES OF THE MOBILITY VEHICLE

(71) Applicant: C.R.F. SOCIETA' CONSORTILE PER AZIONI, Orbassano (IT)

(72) Inventors: Sergio Damiani, Orbassano (IT); Enrica Deregibus, Orbassano (IT); Cristina Zoldan, Orbassano (IT); Giovanni Rosso, Orbassano (IT); Alessio De Stephanis, Orbassano (IT)

(73) Assignee: C.R.F. SOCIETA' CONSORTILE PER AZIONI, Orbassano (IT)

( * ) Notice: Subject to any disclaimer, the term of this patent is extended or adjusted under 35 U.S.C. 154(b) by 0 days.

(21) Appl. No.: 17/919,766

(22) PCT Filed: Jul. 9, 2021

(86) PCT No.: PCT/IB2021/056178
§ 371 (c)(1),
(2) Date: Oct. 19, 2022

(87) PCT Pub. No.: WO2022/009164
PCT Pub. Date: Jan. 13, 2022

(65) Prior Publication Data
US 2023/0161611 A1 May 25, 2023

(30) Foreign Application Priority Data
Jul. 9, 2020 (IT) .................. 102020000016741

(51) Int. Cl.
*G06F 9/451* (2018.01)
*B60K 37/06* (2006.01)

(52) U.S. Cl.
CPC .............. *G06F 9/453* (2018.02); *B60K 37/06* (2013.01); *B60K 2370/161* (2019.05)

(58) Field of Classification Search
CPC ...................................... G06F 3/0481
See application file for complete search history.

(56) References Cited

U.S. PATENT DOCUMENTS 6,621,452 B2 1/2003 Knockeart et al.
6,707,421 B1 3/2004 Drury et al.
(Continued)

FOREIGN PATENT DOCUMENTS

WO WO-2015108757 A1 7/2015

OTHER PUBLICATIONS

International Search Report and Written Opinion of the ISA issued in PCT/IB2021/056178, dated Nov. 17, 2021; ISA/EP.

*Primary Examiner* — Di Xiao
(74) *Attorney, Agent, or Firm* — Harness, Dickey & Pierce, P.L.C.

(57) ABSTRACT

Informational system for a mobility vehicle, comprising an automotive user interface configured to allow a driver and other occupants of the mobility vehicle to interact with the informational system; and automotive storage and processing resources designed to cooperate with the automotive user interface to implement an informational functionality designed to provide the driver of the mobility vehicle with notifications aimed at promoting learning of features of the mobility vehicle. The automotive storage and processing resources are further designed to monitor exploitation of features of the mobility vehicle, and to suggest to the driver exploitation of those features of the mobility vehicle that are seldom exploited or completely unexploited by the driver.

10 Claims, 2 Drawing Sheets

(56) References Cited

U.S. PATENT DOCUMENTS

| | | | |
|---|---|---|---|
| 6,812,888 B2 | 6/2004 | Drury et al. | |
| 10,639,991 B2 | 5/2020 | Ho et al. | |
| 2008/0004793 A1 | 1/2008 | Horvitz et al. | |
| 2014/0136013 A1* | 5/2014 | Wolverton | B60K 37/06 |
| | | | 701/1 |
| 2017/0174080 A1 | 6/2017 | Ho et al. | |
| 2017/0187815 A1* | 6/2017 | Vainas | H04W 4/023 |
| 2017/0315824 A1 | 11/2017 | Ochiai et al. | |
| 2018/0067486 A1 | 3/2018 | Yako et al. | |
| 2019/0111941 A1* | 4/2019 | Hori | G05D 1/021 |
| 2020/0031371 A1* | 1/2020 | Soliman | B60W 10/04 |

\* cited by examiner

ASSISTANCE TO A DRIVER OF A MOBILITY VEHICLE FOR LEARNING FEATURES OF THE MOBILITY VEHICLE

CROSS-REFERENCE TO RELATED APPLICATIONS

This patent application is a U.S. National Phase Application under 35 U.S.C. 371 of International Application No. PCT/IB2021/056178, filed on Jul. 9, 2021, which claims the benefit of Italian patent application no. 102020000016741 filed on Jul. 9, 2020. The entire disclosures of the above-identified applications are incorporated herein by reference.

TECHNICAL FIELD OF THE INVENTION

The present invention relates in general to mobility technologies, and in particular to mobility vehicle driver assistance technologies.

More specifically, the present invention relates to presentation to mobility vehicle drivers of notifications aimed at promoting learning of features of mobility vehicles, reminding availability of functions of the mobility vehicles that are seldom exploited or completely unexploited, informing about availability of new applications just installed or updated and suggesting exploiting appropriate functions of the mobility vehicles in particular operating situations of the mobility vehicles.

The present invention currently finds advantageous, although not exclusive, application on land transport vehicles, irrespective of the number of wheels, axles, engines or propulsions, in particular on road vehicles, whether used for the transport of persons, such as passenger cars, buses, camper vans, etc., or for the transport of goods, such as industrial vehicles (lorries, articulated lorries, articulated vehicles, etc.) or light or medium-heavy commercial vehicles (vans, box vans, cab vans, etc.), to which the following description will refer without losing its generality.

Furthermore, in parallel with the growth and diffusion of automatic or autonomous driving systems, vehicle systems are rapidly transforming into autonomous means of transport without any constraints of maintaining adherence to the ground but also suitable for moving in the space in a broad sense.

The transformation of propulsion means is even more accelerated, as they are no longer based solely on combustion, and therefore it is necessary to move away from the concept of the propulsion system and the source of energy that will be exploited to produce the motion or to support the mobility vehicle in a stable and comfortable position, whose mission will increasingly be that of individual or collective transport in a seamless mode, i.e., with continuous updating not only of information but also of applications of the mobility vehicles.

Therefore, the present invention can be applied not only to terrestrial mobility vehicles, but also to mobility vehicles capable of flying, crossing surface or deep waters, or performing space travels.

SATE OF THE ART

With reference to the automotive sector, in recent years car manufacturers have invested considerable resources in the search for advanced driver assistance systems (ADAS) to improve driving safety and comfort.

For this reason, and as they will help achieve the targets imposed by the EU for reducing road accidents, ADAS are one of the fastest growing segments in the automotive sector and are set to become increasingly popular in the coming years.

The safety features of these systems are designed to prevent collisions and accidents, provide technologies that warn drivers of potential issues, or to avoid collisions by implementing safeguard measures and by taking control of motor-vehicles. Adaptive features can automate lighting, provide adaptive cruise speed control, automate braking, incorporate GPS/traffic alerts, connect smartphones, alert drivers of other motor-vehicles to dangers, keep drivers in the correct lane, or show what is in the blind spots.

ADAS technology is based on vision/camera systems, sensory systems, automotive data networks, Vehicle-to-Vehicle (V2V) or Vehicle-to-Infrastructure (V2I) communication systems. Next-generation ADAS systems will increasingly take advantage of wireless connectivity to add value to V2V or V2I communication.

Technological developments such as the integration of radars and cameras, and the fusion of sensors among multiple applications, are driving cost reductions that are leading to a more significant penetration of ADAS into the automotive market.

The consequence of this penetration is the constant growth of motor-vehicle features which, although described in the increasingly extensive user manuals, often remain unknown to drivers due to a lack of time or interest in consulting them.

Hence, there is a growing need for technology that informs drivers of the many features of vehicles without however distracting the attention of drivers from the task of driving, so that driving safety is not compromised.

US 20080004793 A1 discloses a method for determining when a driver of a motor-vehicle is available to consider information arriving on a mobile device. The method monitors the movement and the position of the motor-vehicle in order to predict a stopping time for the motor-vehicle based on a probability and to provide the information to the driver when the driver is believed to be available.

WO 2015/108757 A1 discloses a method for presenting notifications to a driver of a motor-vehicle which provides that certain types of notifications, for example those aimed at assisting the driver in learning the functions of the motor vehicle and improving driving efficiency, are not presented to the driver when the motor vehicle is moving, but only when the motor vehicle has stopped and an appropriate point for the notifications to be provided has been reached.

Other motor-vehicle informational systems are disclosed in U.S. Pat. Nos. 6,621,452 B2, 6,707,421 B1, and U.S. Pat. No. 6,812,888 B2.

US 2018/067486 A1 discloses an advanced tutorial for an autonomous motor vehicle, wherein a moto vehicle system comprises a user interface, an autonomous mode controller and a processor. The autonomous mode controller controls a vehicle in partially autonomous mode. The processor receives a first input from a user requesting the semi-autonomous mode and commands the user interface to present a tutorial associated with semi-autonomous mode. The processor receives a second input from a user indicating that a driver has completed the tutorial and activates the partially autonomous mode in response to receiving the second user input.

US 2017/315824 A1 discloses an intelligent tutorial to train users of a motor vehicle to use gestures as a shortcut for controlling motor vehicle functions. A variety of tasks related to the control of the motor vehicle functions completed by a user are monitored. For each activity, it is determined whether the activity was completed by the user using a default gesture associated with the activity or manually, without using the predefined gesture associated with the activity. For each activity, the predefined gesture is designated as a learned gesture or an unlearned gesture. After a predetermined period of time, it is determined that a gesture use history associated with the user includes at least one unlearned gesture. The user may be presented with user-defined instructions that at least one unlearned gesture is available for use as a shortcut to control a motor vehicle function.

US 2017/174080 A1 discloses a device for controlling the gear support of a motor vehicle comprising a portion that determines the driving environment of the motor vehicle; a portion which determines a gear support device useful from one or different gear support devices mounted on the motor vehicle in accordance with the driving environment; a portion which has a driving support; and a portion which controls the portion having a driving support based on the frequency of use of the gear support device determined by the portion that determines a useful support device.

OBJECT AND SUMMARY OF THE INVENTION

The Applicant has ascertained that informing drivers of the motor vehicles about the numerous features thereof is a fundamental requirement in order to enable the drivers to have a full overview of the various equipment of the motor-vehicles, so that they can derive maximum benefit therefrom, especially from the point of view of driving safety.

Aim of the present invention is hence to provide an improved technology for informing drivers and, possibly, also passengers of motor vehicles about the numerous features thereof, but without distracting the drivers' attention from the main task of driving, so that driving safety is not compromised.

According to the present invention, an informational system for a mobility vehicle is provided, as claimed in the appended claims.

DETAILED DESCRIPTION OF PREFERRED EMBODIMENTS OF THE INVENTION

The present invention will now be described in detail with reference to the accompanying drawings to enable a skilled person to realize and use it. Various modifications to the embodiments presented shall be immediately clear to persons skilled in the art and the general principles disclosed herein could be applied to other embodiments and applications but without thereby departing from the scope of protection of the present invention as defined in the appended claims. Therefore, the present invention should not be considered limited to the embodiments described and shown but should be granted the widest protective scope in accordance with the features described and claimed.

Where not otherwise defined, all the technical and scientific terms used herein have the same meaning commonly used by persons of ordinary skill in the field pertaining to the present invention. In the event of a conflict, this description, including the definitions provided, shall be binding. Furthermore, the examples are provided for illustrative purposes only and as such should not be considered limiting.

In particular, the block diagrams included in the accompanying figures and hereinafter described must not be considered as a representation of the structural features, i.e. construction limitations, but must be construed as a representation of functional features, namely intrinsic properties of the devices and defined by the obtained effects i.e. functional limitations which can be implemented in different ways, so as to protect the functionality thereof (chance of functioning).

In order to facilitate understanding of the embodiments described herein, reference will be made to some specific embodiments and a specific language will be used to describe them. The terminology used herein is for the purpose of describing only particular embodiments, and is not intended to limit the scope of the present invention.

Figure 1:
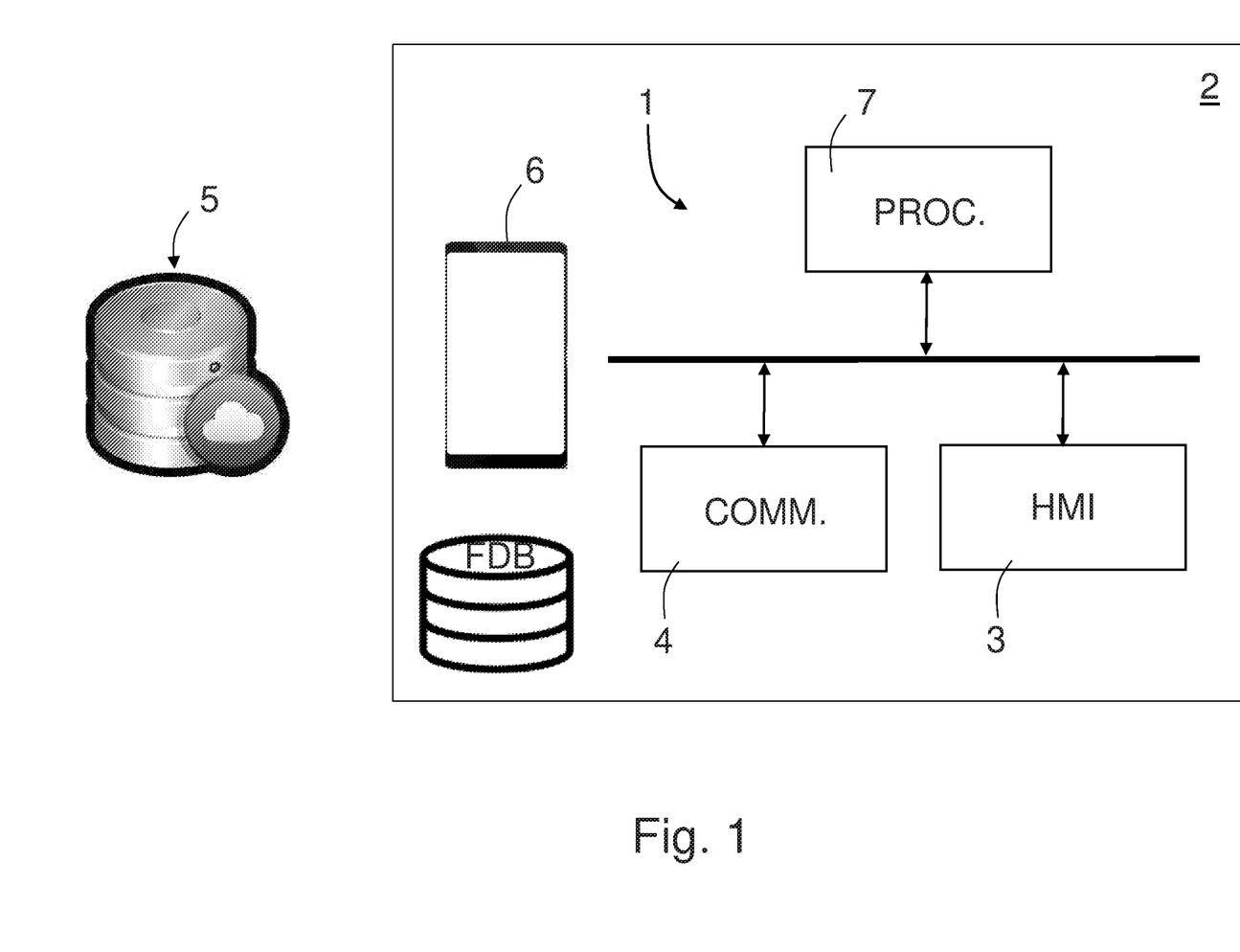
FIG. 1 shows a high-level block diagram of an informational system for a mobility vehicle according to the present invention.

FIG. 1 shows an informational system 1 of a mobility vehicle 2 according to the present invention.

The informational system 1 of a mobility vehicle 2 comprises:
- an automotive user interface 3 (HMI—Human Machine Interface) configured to allow the driver and possibly also other occupants of the mobility vehicle 2 to interact with the informational system 1,
- an automotive communication interface 4 to enable the informational system 1 to communicate with remote storage and processing resources 5 and with user terminals 6 of occupants of the mobility vehicle 2 and in the form of hand-held or wearable personal electronic communication devices, such as smartphones, phablets, tablets, personal computers, smartwatches, etc., on each of which a software application specifically designed by the manufacturer can be stored and executed to enable the mobile personal communication devices to communicate with the mobility vehicle 2 through the automotive communication interface 4 so as to be able to interact with some on-board automotive systems of the mobility vehicle 2, such as an infotainment system and, as regards the present invention, the informational system 1, and
- automotive storage and processing resources 7 designed and programmed to communicate with the automotive user interface 3 and with the automotive communication interface 4 and to store and execute a software comprising instructions that, when executed, cause the automotive storage and processing resources 7 to become configured to cooperate with the automotive user interface 3 and with the automotive communication interface 4 to implement an informational functionality designed to provide the driver and any passengers of the mobility vehicle 2 with notifications aimed at promoting learning of features of the mobility vehicle 2, at reminding the driver of availability of functions of the mobility vehicle 2 that are seldom exploited or completely unexploited, at informing the driver about availability of just installed or updated applications, and at suggesting to the driver exploitation of functions of the mobility vehicle 2 in particular operating situations/conditions of the mobility vehicle 2 in which exploitation of these functions would be or would have been appropriate, as described in detail below.

For implementing the informational functionality, it is emphasised that what matters are the operations that need to be implemented in order to achieve it and not the hardware and software architectures with which these operations are implemented, to the extent that these operations could be implemented via a concentrated architecture, i.e., by the only automotive storage and processing resources 7 of the mobility vehicle 2, or through a distributed architecture, i.e., distributed between the automotive storage and processing resources 7 of the mobility vehicle 2 and the remote storage and processing resources 5, depending on the hardware and software architectures that the manufacturer of the mobility vehicle 2 will consider to be appropriate to implement the informational function.

For this reason, and also for descriptive convenience, and without this being in any way considered limiting the hardware and software architectures, FIG. 1 exemplarily shows the situation in which the informational function is implemented by the automotive storage and processing resources 7 of the mobility vehicle 2.

In order to allow the driver and other occupants of the mobility vehicle 2 to interact with the informational system 1, the automotive user interface 3 is configured to allow a driver of the mobility vehicle 2 to be identified and to impart commands regarding operation of the informational function, and to inform the driver about the various features of the informational means 2 so as to promote learning thereof by the driver, to remind the driver of availability of functions of the mobility vehicle 2 that are seldom exploited or completely unexploited, to inform the driver about availability of just installed or updated applications, and to suggest to the driver exploitation of functions of the mobility vehicle 2 in particular operating situations/conditions of the mobility vehicle 2 in which exploitation thereof would be or would have been appropriate, as described in detail below.

To this end, the automotive user interface 3 comprises:
- a display, appropriately chosen among those on board the mobility vehicle 2, for example the display of the infotainment system or the display sometimes provided in the driving instrumentation, or an additional display, on which an ad hoc Graphical User Interface (GUI) is displayed, respecting the limit of distraction and maximum usability, and usually in the form of a series of icons user-selectable via soft or hard buttons, relating to the operation of various on-board systems of the mobility vehicle 2, such as the infotainment system, the air conditioning system, the satellite navigation system, etc.;
- function selection and activation buttons, some of which are hard buttons, placed at various points in the passenger compartment of a mobility vehicle 2, e.g., in the motor vehicles typically on the steering wheel and in the central console, and others soft buttons, i.e., shown on the display, and
- an optional voice recognition and synthesis system.

The automotive communication interface 3 is designed to communicate with the remote storage and processing resources 5 and with the user terminals 6 on board the mobility vehicle 2 based on one or more of the following communication technologies:
- one or different short-range wireless (radio or optical) communication technologies conveniently comprising one or more between Bluetooth technology, ZigBee technology and Wi-Fi technology, hereinafter individually and collectively conveniently referred to as V2D (Vehicle-to-Device) communication system, which is operable to detect and identify within its communication range short-range two-way wireless communication systems of user terminals or personal electronic mobile communication devices on board the mobility vehicle 2, hereinafter abbreviated as D2V (Device-to-Vehicle) communication systems, and to establish a communication with the detected and identified D2V communication systems, possibly after an appropriate pairing procedure, depending on whether or not such a procedure is required by the implemented communication technology,
- one or different long-range wireless (radio or optical) communication technologies comprising one or different of 3G, 4G, 5G cellular communication technologies; and
- a wired, conveniently USB (Universal Serial Bus) communication technology.

In order to implement the informational functionality, the informational system 1 further comprises a database DB stored in the automotive storage and processing resources 7 of the mobility vehicle 2 and structured to store:
- an available feature list AFL containing a list of all available features of the mobility vehicle 2;
- a used feature list UFL for each driver of the mobility vehicle 2 who is identified in the informational system 1 by means of a unique driver identification code ID, each used feature list UFL contains a list of all features of the mobility vehicle 2 exploited by the driver;
- a learning tip list LTL for each driver of the mobility vehicle 2, each learning tip list LTL contains learning tips for features of the mobility vehicle 2 that the manufacturer considers appropriate to notify the driver in order to facilitate the use thereof;
- an advisor tip list ATL for each driver of the mobility vehicle 2, each advisor tip list ATL contains advisor tips for safety-related features of the mobility vehicle 2 that the manufacturer considers appropriate to recommend the use thereof to the driver under certain operating conditions/situations, such as, in the automotive field, features related to ADAS systems;
- a reminder tip list RTL for each driver of y vehicle 2, each reminder tip list RTL contains reminder tips for features of the mobility vehicle 2 that the manufacturer considers appropriate to remind the driver in order to facilitate exploitation thereof, such as, for example, features related to the powertrain, the electronic speed adjustment system, whether it be a simpler non-adaptive cruise control (CC), also known as Tempomat, or the more advanced adaptive cruise control (ACC), the intelligent speed adaptation system (or "Intelligent Speed Assist"—ISA), the traffic sign recognition system (TSR), and the different driving modes of the mobility vehicle 2, such as manual or automated driving with different modes;
- optionally, a sponsor tip list STL for each driver of the mobility vehicle 2; each sponsor tip list STL contains sponsor tips to be provided to the driver while using the mobility vehicle 2, such as, for example, announcement of a new version of the software application developed by the automotive manufacturer to enable personal electronic mobile communication devices to communicate with the automotive communication interface 4 of the mobility vehicle 2 and interact with on-board systems, such as, for example, for mobility vehicle in the form of a motor vehicles, the automotive infotainment system; and, finally, a notified tip list PTL for each driver of the mobility vehicle 2, each notified tip list PTL contains a list of tips notified to the driver.

In order to implement the informational functionality, the automotive storage and processing resources 7 of the mobility vehicle 2 are programmed to carry out a feature learning step for learning the features of the mobility vehicle 2, during which the driver is provided with learning tips listed in the learning tips list LTL, and an operating step, during which the driver is provided with advisor, reminder, and sponsor tips listed in the advisor, reminder and sponsor tips lists ATL, RTL, STL.

The automotive storage and processing resources 7 may be programmed to implement the operating step either concurrently with the feature learning step or only after the feature learning step has been completed, i.e., after all learning tips listed in the learning tip list LTL have been provided to the driver.

When the automotive storage and processing resources 7 are programmed to carry out and complete the feature learning step prior to implementing the operating step, the automotive storage and processing resources 7 are programmed to provide the driver with learning tips according to a proprietary learning rule system that the manufacturer considers to be appropriate to result in the informational functionality having the desired performance.

By way of non-limiting example, the learning rule system may comprise a feature notification rule envisaging to provide the driver with one learning tip per day or one learning tip per mission of the mobility vehicle 2, defined as the period of time between a power-on and a subsequent power-off of the powertrain, until the learning tip list LTL is exhausted, after which the feature learning step is considered completed and no more learning tips will be provided to the driver.

The learning rule system may also comprise a feature notification exclusion rule that provides for excluding from notification to the driver those learning tips that relate to features of the mobility vehicle 2 that are exploited by the driver according to a proprietary exploitation rule, e.g., that are used regularly or even only occasionally by the driver, or that are known to have been exploited at least once by the driver.

To this end, the automotive storage and processing resources 7 are programmed to:
monitor exploitation of the features of the mobility vehicle 2 by the driver,
update the used feature list UFL accordingly, i.e. by including in the used feature list UFL data identifying the features of the mobility vehicle 2 that are exploited by the driver and data indicative of how and when these features have been exploited by the driver, and
exclude from notification to the driver those learning tips that relate to features of the mobility vehicle 2 that are exploited by the driver.

At each learning tip provided to the driver, the automotive storage and processing resources 7 are then programmed to update provided tip list PTL accordingly, i.e., by inserting in the provided tip list PTL an indication that a learning tip has been provided to the driver.

Figure 2:
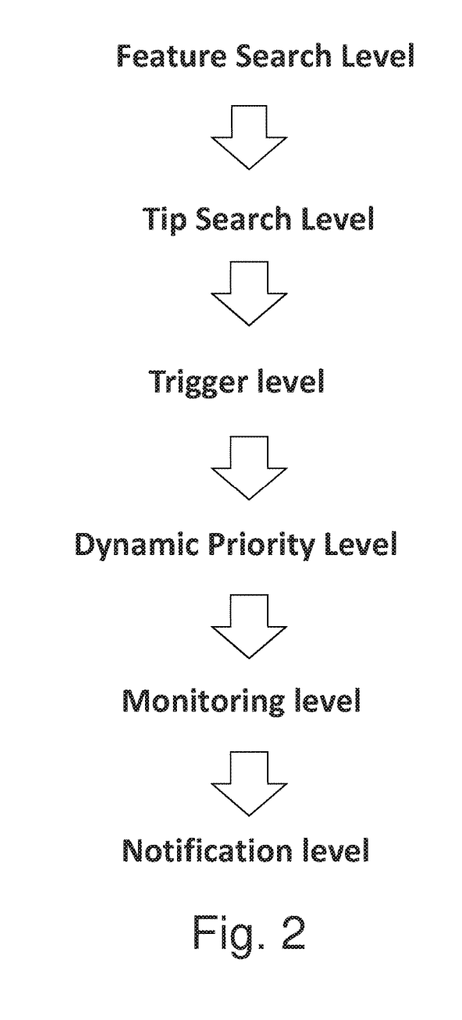
FIG. 2 shows a multi-tier architecture of the operation of the informational system shown in FIG. 1.
Figure 3:
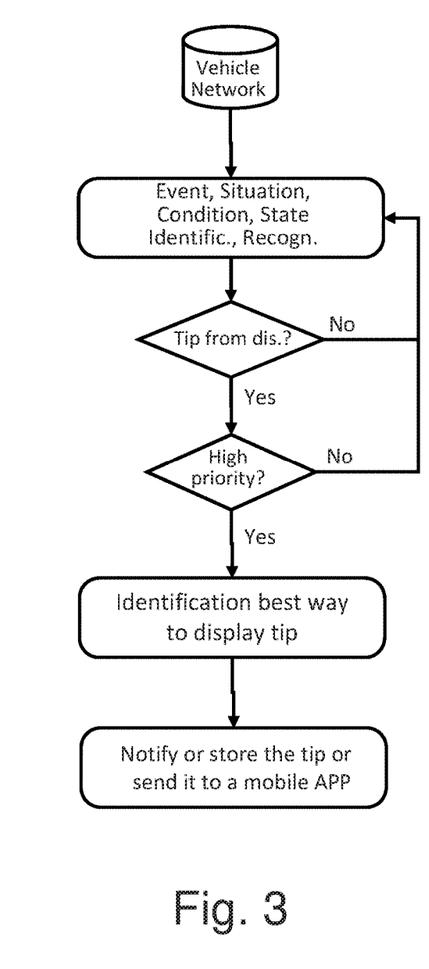
FIG. 3 shows a corresponding high-level block diagram of the operation of the informational system shown in FIG. 1.

When the feature learning step has been completed, i.e., after all learning tips in the learning tip list LTL have been provided to the driver, the automotive storage and processing resources 7 are programmed to carry out the operating step according to a multi-tier architecture and a corresponding high-level block diagram shown in FIGS. 2 and 3.

As shown in FIGS. 2 and 3, in the operating step, the automotive storage and processing resources 7 are programmed to:
monitor exploitation of the features of the mobility vehicle 2 by the driver, updating the used feature list UFL accordingly, i.e. including in the used feature list UFL data identifying the features of the mobility vehicle 2 exploited by the driver and data indicative of how and when these features have been exploited by the driver,
check the available feature list AFL to identify any features of the mobility vehicle 2 for which it is appropriate to provide tips to the driver, hence forming a corresponding a list of features to be notified to the driver ("Feature Search Layer");
if the list of features to be notified to the driver formed in the Feature Search Layer is not empty, check the reminder, advisor, and sponsor tip lists RTL, ATL and STL to identify any potential reminder, advisor, and sponsor tips that may be notified to the driver for those features of the mobility vehicle 2 in the list of features to be notified to the driver, thus forming a corresponding list of potential tips to be provided to the driver ("Tip Search Layer");
if the list of potential tips to be provided to the driver formed in the Tip Search Layer is not empty, identify in the list of potential tips to be provided to the driver any potential tips that meet one or different proprietary trigger conditions considered appropriate for actually providing the potential tips to the driver of the mobility vehicle 2, thus forming a corresponding list of actual tips to be provided to the driver (Trigger Layer);
if the list of actual tips to be provided to the driver formed in the Trigger Layer is not empty, identify in the list of actual tips to be provided to the driver, priority tips to be primarily provided to the driver with respect to other secondary tips to be provided subsequently, thus defining a tip notification priority order ("Dynamic Priority Layer");
monitor occurrence of one or different proprietary safety conditions considered appropriate to provide the driver with the tips listed in the list of actual tips to be provided to the driver (Monitor Layer); and
when the different safety condition(s) is(are) determined to occur, provide one or more of the tips in the list of actual tips to be provided to the driver according to the tip notification priority order defined in the Dynamic Priority Level, updating the provided tip list PTL accordingly ("Tip Notification Layer").

In the Feature Search Layer, the features of the mobility vehicle 2 to be notified to the driver are identified based on a proprietary feature identification rule system implemented by a rule engine and that take account of events, operating situations/conditions, states, and quantities of the mobility vehicle 2 that allow features of the mobility vehicle 2 to be identified that have not been exploited or are generally seldom exploited in operating situations/conditions in which exploitation would instead be advisable or expedient to the benefit, for example, of the safety of the mobility vehicle 2 and, hence, of passengers thereof, of fuel saving, etc., or that have been or are generally exploited inappropriately in operating situations/conditions in which it would instead have been more appropriate to exploit different features of the mobility vehicle 2.

In the Tip Search Level, the potential tips to be provided to the driver are identified based on a proprietary tip identification rule system implemented by a rule engine and that take into account operating situations/conditions of the mobility vehicle 2 and the tip notification history, as well as additional events, states or quantities that the manufacturer considers to be appropriate to take into account.

The proprietary tip identification rule system may for instance provide that, should a tip be ignored or not followed by the driver for a certain number of times, the tip and the related feature of the mobility vehicle 2 may be disregarded in the Feature Search Level and in the Tip Search Level for a certain period of time, depending also on the travel frequency.

In the Trigger Level, occurrence of one or more of the following operating conditions is monitored, upon occurrence of which, either simultaneous or in a predetermined sequence, a potential tip included in the list of potential tips to be provided to the driver is inserted in the list of actual tips to be provided to the driver:

the feature of the mobility vehicle 2 relating to the potential tip is never or seldom exploited according to a proprietary exploitation rule, the distance travelled by the mobility vehicle 2 since the last actual notification to the driver of the potential tip is greater than a threshold distance, which depends on the driver and the use of the mobility vehicle 2, and the time elapsed since the last actual notification to the driver of the potential tip is longer than a threshold time interval which is commensurate with the threshold distance and hence depends on the driver and the use of the mobility vehicle 2.

In the Dynamic Priority Level, the priority tips to be provided to the driver are identified based on a proprietary tip identification rule system implemented by a rule engine and that take into account operating situations/conditions of the mobility vehicle 2, the tip notification history, as well as additional events, states or quantities that the manufacturer considers appropriate to take into account and, if available and subject to the consent of the driver, of driver's customization data.

By way of non-limiting example, the priority notification rule system may comprise a priority notification rule based on the type and/or importance of the features of the mobility vehicle 2, so as to provide the driver first with advisor tips relative to ADAS-related features, then with reminder tips related to e.g. powertrain features or CC, ACC, ISA, TSR systems, and finally with sponsor tips.

The priority notification rule system may also comprise a notification priority rule based on the non-use of the features of the mobility vehicle 2 in terms of time or distances travelled by the mobility vehicle 2.

In a simpler embodiment, the priority notification rule system may be based on a FIFO (First In First Out) logic, while in a more advanced embodiment, the priority notification rule system may be based on the learning of the driver's reactions.

In the Monitoring Level, occurrence of a main set of operating conditions that the manufacturer considers to be appropriate to adopt is monitored and upon of which, either the simultaneous or in a predetermined sequence, the tips listed in the list of the actual tips to be provided to the driver are actually provided to the driver. In the automotive application, the main set of operating conditions comprises one or different operating conditions conveniently selected from the group comprising:

the speed of the motor-vehicle is lower than a safe speed, e.g. 130 km/h or 80 mi/h, the steering angle is in a steering angle range indicative of the motor vehicle travelling along a substantially rectilinear section of road, the longitudinal acceleration of the motor vehicle is in a longitudinal acceleration range indicative of the motor vehicle travelling at a substantially regular speed, without significant accelerations or decelerations, the brake pedal is not operated, indicative of the motor vehicle not braking significantly, the degree of operation of the accelerator pedal is lower than a maximum operation degree, indicative of the motor vehicle not accelerating significantly, the electronic anti-lock braking system (ABS) is inactive, indicative of the motor vehicle not braking to such an extent that would cause the motor-vehicle's wheels to lock, the electronic stability control (ESC) is inactive, indicative of the motor vehicle not swerving, the electronic traction control system (TCS or ASR) is inactive, indicative of the motor-vehicle's wheels not slipping during acceleration, direction indicators are inactive, indicative of the motor-vehicle not about to change direction, the front and/or rear fog lamps are not activated, indicative of the mobility vehicle 2 travelling along a road section along which there is probably no fog and, hence, visibility is good, and the front windscreen wipers are inactive, indicative that it is not raining.

For off-road motor vehicles, in the Monitoring Level, the tips listed in the list of the actual tips to be provided to the driver are actually provided to the driver upon detection of simultaneous occurrence, in addition to the main set of operating conditions, also of a secondary set of operating conditions that the manufacturer considers to be appropriate to adopt and comprising one or different operating conditions chosen from the group comprising:

the longitudinal acceleration of the motor-vehicle is lower than a maximum longitudinal acceleration, the longitudinal deceleration of the motor-vehicle is lower than a maximum longitudinal deceleration, the absolute value of the lateral acceleration of the motor-vehicle is lower than a maximum lateral acceleration, the absolute value of the vertical acceleration of the motor-vehicle is lower than a maximum vertical acceleration, and the variation of the three-dimensional acceleration of the motor-vehicle, formed by the longitudinal, lateral, and vertical accelerations, is lower than a maximum allowable variation within a mobile time window.

In the Tip Notification Level, the tips are notified to the driver via the automotive user interface 3, according to proprietary tip notification modes developed by the manufacturer to avoid or limit distracting the driver from the driving task, thus ensuring that the tip notification fails to adversely affect the safe operation of the mobility vehicle 2.

In principle, tip notification modes are designed to distribute tips in different places, continuously updatable, adaptable to changes in contexts, people, and situations.

For example, the tip notification modes may provide for the identification of the most appropriate notification device and channel depending on the operating conditions of the mobility vehicle 2, of the external environmental conditions (weather, visibility, external lighting, etc. as well as may provide for the possibility for the driver to customise the tip notification mode by selecting it from a range set by the automotive manufacturer.

The tip notification modes may also conveniently provide for the notification of a limited number of tips in the unit of time, e.g., only one tip per day, or in the unit of space, e.g., only e tip per mission of the mobility vehicle 2.

Where possible or even just convenient, the blockchain technology may be exploited in the tip notification as a method for increasing value as well as information security.

As regards the tip notification device, the automotive storage and processing resources 7 are programmed to notify the tips on board the mobility vehicle 2 and possibly also on the driver's personal electronic mobile communication device 6, to which the tips are sent via the automotive communication interface 4 either directly or via the remote storage and processing resources 5.

On the other hand, as regards the tip notification channel, the automotive storage and processing resources 7 of the mobility vehicle 2 are programmed to notify the tips visually, i.e., displaying an appropriate notification graphical interface (GUI) on one of the electronic displays of the mobility vehicle 2 and on the display of the driver's personal electronic mobile communication device 6, possibly together with an audible notification signal emitted through the loudspeakers of a sound system of the mobility vehicle 2, or vocally, i.e., vocally synthesising the texts of the tips via a speech synthesizer, or either visually, soundly or vocally, possibly also adding a haptic notification signal.

The user interface may also be designed to allow the driver access, when the mobility vehicle 2 is stationary, a settings page through which the driver may enable or disable the informational functionality and customise behaviour thereof (text or voice notifications, notification sounds, etc.), as well as display an overview of the tips that the informational functionality would like to notify him/her of, display or listen to the notified tips one at a time, postpone displaying or listening to the notified tips, disable notification of tips individually or by category, indicate whether he/she wishes to receive one tip per day or per mission of the mobility vehicle 2, or indicate how many tips he/she wishes to receive per day or per mission.

On the other hand, if the automotive storage and processing resources 7 of the mobility vehicle 2 are programmed to carry out the feature learning step concurrently with the operating step, the automotive storage and processing resources 7 are programmed to cause:
  in the Feature Search Level, the proprietary feature identification rule system to also identify a feature of the mobility vehicle 2 for which no learning tip has yet been provided to the driver;
  in the Tip Search Level, the learning tip related to the feature identified in the Feature Research Level be identified;
  in the Trigger Level, the identified learning tip to be included in the list of actual tips to be provided to the driver only if the related feature of the mobility vehicle 2 is determined not to have been exploited by the driver yet, or irrespective of exploitation thereof, and irrespective of the fact that it obviously fails to meet the other above-indicated operating conditions; and
  in the Dynamic Priority Level, the priority notification rule system to be such that the identified learning tip has the highest priority, and consequently it is the first to be notified to the driver in the Notification Level when the above safety condition occurs.

The database DB containing the various lists mentioned above, i.e., the available feature List AFL, the used feature list LFL, the learning tip list LTL, the advisor tip list ATL, the reminder tip list RTL, the sponsor tip list STP, and the provided tip list PTL, as well as the rule systems and the trigger and safety conditions used by the rule engines in the various Layers of the multi-tier architecture of the informational functionality can be updated by the remote automotive storage and processing resources 5 through the automotive communication interface 4.

Finally, in order for the informational functionality to show a customised behaviour for each of the potential drivers of the mobility vehicle 2, the automotive storage and processing resources 7 are designed to identify the driver of the mobility vehicle 2 based on one or different quantities indicative of the identity of the driver and provided by one or different sources of information on the identity of the driver comprising, conveniently, one or more of the following:
  an automotive infotelematic system of the mobility vehicle 2 with which the driver's personal electronic mobile communication device 6 is paired when the driver is in the mobility vehicle 2, which pairing, as is known, occurs following a pairing procedure during which the identifier of the personal electronic mobile communication device 6 is recognised,
  a satellite navigation system, through which the driver can be recognised based on his or her usual routes,
  the automotive user interface 4, which can be programmed to invite the driver to identify him/herself once he or she is driving the mobility vehicle 2,
  a driver's recognition functionality based on the driver's driving style, which can be computed based on dynamic quantities of the mobility vehicle 2 measured by an automotive sensory system of the mobility vehicle 2 or computed based on the quantities measured by the automotive sensory system and indicative of the driver's driving style, such as, conveniently, the longitudinal speed of the motor-vehicle, the lateral acceleration of the motor-vehicle, and the yaw rate of the mobility vehicle 2, and
  a specific driver's registration functionality through which such an association may be made.

The invention claimed is:

1. An informational system for a mobility vehicle, comprising:
  an automotive user interface configured to allow a driver and other occupants of the mobility vehicle to interact with the informational system, and
  an automotive storage and processor configured to cooperate with the automotive user interface to implement an informational functionality configured to provide the driver of the mobility vehicle with notifications configured to promote learning of features of the mobility vehicle;
  the automotive storage and processor configured to:
    monitor exploitation of features of the mobility vehicle by the driver, and
    suggest to the driver exploitation of those features of the mobility vehicle that are determined to be seldom exploited or completely unexploited by the driver;
  the automotive storage and processor are further configured to execute:
    a learning step during which the driver of the mobility vehicle is provided with tips configured to promote learning of features of the mobility vehicle; and an operating step during which the driver of the mobility vehicle is provided with tips configured to promote exploitation of features of the mobility vehicle;

to implement the operating step, the automotive storage and processor are configured to:

identify one or different features of the mobility vehicle to be notified to the driver based on proprietary feature identification rules that take account of events, operating situations/conditions, states, and quantities of the mobility vehicle that allow features of the mobility vehicle to be identified that generally have not been exploited or are seldom exploited in operating situations/conditions in which their exploitation would instead be advisable or expedient to the benefit of the safety of the mobility vehicle and, hence, of passengers thereof, of fuel saving, or that generally have been or are exploited inappropriately in operating situations/conditions in which it would instead have been more appropriate to exploit different features of the mobility vehicle;

identify one or different potential tips to be provided to the driver in relation to the identified feature(s) of the mobility vehicle to be notified to the driver based on proprietary tip identification rules that take into account the operating situations/conditions of the mobility vehicle and the tip notification history;

monitor occurrence of one or different proprietary tip notification trigger conditions, upon occurrence of which it is considered to be appropriate to actually notify the driver of the mobility vehicle with one or more of the potential tips identified;

monitor occurrence of one or different proprietary tip notification safety conditions, upon occurrence of which it is considered to be safe to notify the driver with one or more of the identified potential tips; and upon occurrence of the one or different proprietary tip notification trigger and safety conditions, provide the driver, via the automotive user interface, with one or more of the identified potentials tips according to a proprietary tip notification priority order and a proprietary tip notification mode developed to avoid or limit distracting the driver from the driving task.

2. The informational system of claim 1, wherein the automotive storage and processor are further configured to:

exclude from notification to the driver, during the feature learning step, those tips relating to features of the mobility vehicle that are exploited by the driver according to a proprietary exploitation rule.

3. The informational system of claim 1, wherein the automotive storage and processor are further configured to implement the operating step only after the learning step has been completed.

4. The informational system of claim 1, further comprising a database (DB) structured to store:

an available feature list (AFL) containing a list of all available features of the mobility vehicle;

a used feature list (UFL) for each driver of the mobility vehicle who is identified in the informational system by means of a unique driver identification code (ID), each used feature list (UFL) contains a list of features of the mobility vehicle exploited by the driver;

a learning tip list (LTL) for each driver of the mobility vehicle, each learning tip list (LTL) contains learning tips for features of the mobility vehicle;

an advisor tip list (ATL) for each driver of the mobility vehicle, each advisor tip list (ATL) contains advisor tips for features of the mobility vehicle;

a reminder tip list (RTL) for each driver of the mobility vehicle, each reminder tip list (RTL) contains reminder tips for features of the mobility vehicle;

optionally, a sponsor tip list (STL) for each driver of the mobility vehicle, each sponsor tip list (STL) contains sponsor tips to be provided to the driver of the mobility vehicle; and a provided tip list (PTL) for each driver of the mobility vehicle, each provided tip list (PTL) contains a list of tips provided to the driver;

the automotive storage and processor are configured to implement the learning step, during which the driver of the mobility vehicle is provided with learning tips in the learning tip list (LTL), and the operating step during which the driver of the mobility vehicle is provided with advisor, reminder, and, optionally, sponsor tips in the advisor, reminder and sponsor tip lists (ATL, RTL, STL).

5. The informational system of claim 4, wherein the automotive storage and processor are further configured to implement the operating step according to a multi-tier architecture comprising:

a Feature Search Layer, in which the available feature list (AFL) is checked to identify whether there are features of the mobility vehicle for which it is advisable to provide tips to the driver, thereby forming a corresponding list of features to be notified to the driver;

a Tip Search Layer, in which, if the list of features to be notified to the driver and formed in the Feature Search Layer is not empty, the reminder, advisor, and sponsor lists (RTL, ATL, STL) are checked to identify potential reminder, advisor, and sponsor tips that may be potentially provided to the driver for those features of the mobility vehicle in the list of features to be notified to the driver, thereby forming a corresponding list of potential tips to be provided to the driver;

a Trigger Layer, in which, if the list of potential tips to be provided to the driver and formed in the Tip Search Layer is not empty, potential tips in the list of potential tips to be provided to the driver are identified that meet one or different proprietary tip notification trigger conditions that are considered to be appropriate to actually provide the potential tips to the driver of the mobility vehicle, thereby forming a corresponding list of actual tips to be provided to the driver;

a Dynamic Priority Layer, in which, if the list of actual tips to be provided to the driver and formed in the Trigger Layer is not empty, priority tips are identified in the list of actual tips to be provided to the driver that should be primarily provided to the driver with respect to other secondary tips to be provided subsequently, thereby defining a tip notification priority order;

a Monitor Layer, in which occurrence is monitored of one or different proprietary tip notification safety conditions, upon occurrence of which it is considered to be appropriate to provide the driver with the tips in the list of actual tips to be provided to the driver; and a Tip Notification Layer, in which, when the monitored proprietary tip notification safety condition(s) is(are) determined to occur, one or more of the actual tips in the list of actual tips to be provided to the driver are actually provided to the driver according to the tip notification priority order defined in the Dynamic Priority Layer.

6. The informational system of claim 5, wherein:

in the Feature Search Layer, the features of the mobility vehicle to be notified to the driver are identified based on one or different proprietary feature identification rules that take account of events, operating situations/conditions, states, and quantities of the mobility vehicle that allow features of the mobility vehicle to be identified that generally have not been exploited or are seldom exploited in operating situations/conditions in which their exploitation would instead be advisable or expedient to the benefit of the safety of the mobility vehicle and, hence, of passengers thereof, of fuel saving, etc., or that generally have been or are exploited inappropriately in operating situations/conditions in which it would instead have been more appropriate to exploit different features of the mobility vehicle;

in the Tip Search Layer, the potential tips to be provided to the driver are identified based on one or different proprietary identification tip rules that take account of the operating situations/conditions of the mobility vehicle and of the tip notification history;

in the Trigger Layer, potential tips in the list of potential tips to be provided to the driver are entered in the list of actual tips to be provided to the driver when the following operating conditions occur simultaneously or in a predetermined sequence:

the feature of the mobility vehicle corresponding to the potential tip is determined to be never or seldom exploited according to a proprietary exploitation rule, the distance travelled by the mobility vehicle since the last actual notification to the driver of the potential tip is greater than a threshold distance, the time elapsed since the last actual notification to the driver of the potential tip is greater than a threshold time interval; and in the Dynamic Priority Layer the priority tips to be provided to the driver are identified based on one or different proprietary priority notification rules that take account of the operating situations/conditions of the mobility vehicle and of the tip notification history, and, if available and with the prior consent of the driver, of driver customization data.

7. The informational system of claim 5, for a mobility vehicle in the form of a motor vehicle, wherein in the Monitor Layer a main set of operating conditions is monitored and comprising one or different operating conditions chosen in the group comprising:

the speed of the motor vehicle is lower than a safety speed, the steering angle is in a steering angle range indicative of the motor vehicle travelling along a substantially rectilinear section of road, the longitudinal acceleration of the motor vehicle is in a longitudinal acceleration range indicative of the motor vehicle travelling at a substantially regular speed, without significant accelerations or decelerations, the brake pedal is not operated, indicative of the motor vehicle not braking significantly, the degree of operation of the accelerator pedal is lower than a maximum operation degree, indicative of the motor vehicle not accelerating significantly, the electronic anti-lock braking system (ABS) is inactive, indicative of the motor vehicle not braking to such an extent that would cause the motor-vehicle's wheels to lock, the electronic stability control (ESC) is inactive, indicative of the motor vehicle not swerving, the electronic traction control system (TCS or ASR) is inactive, indicative of the motor-vehicle's wheels not slipping in acceleration, direction indicators are inactive, indicative of the motor-vehicle not about to change direction, the front and/or rear fog lamps are not activated, indicative of the motor-vehicle travelling along a road section in which there is probably no fog and, therefore, visibility is good, and the front windscreen wipers are inactive, indicative of the fact that it is not raining.

8. The informational system of claim 7, for a mobility vehicle in the form of an off-road motor-vehicle, wherein in the Monitor Layer a secondary set of operating conditions is also monitored and comprising one or different operating conditions chosen in the group comprising:

the longitudinal acceleration of the motor-vehicle is lower than a maximum longitudinal acceleration, the longitudinal deceleration of the motor-vehicle is lower than a maximum longitudinal deceleration, the absolute value of the lateral acceleration of the motor-vehicle is lower than a maximum lateral acceleration, the absolute value of the vertical acceleration of the motor-vehicle is lower than a maximum vertical acceleration, and the variation of the three-dimensional acceleration of the motor-vehicle, formed by the longitudinal, lateral, and vertical accelerations, is lower than a maximum allowable variation within a mobile time window.

9. The informational system of claim 5, wherein in the Tip Notification Layer, tips are notified to the driver via the automotive user interface, according to proprietary tip notification modes developed by the manufacturer to avoid or limit distracting the driver from the driving task and configured to distribute the tips in different places, continuously updatable, and adaptable to changes in contexts, people, and situations.

10. A software loadable in automotive storage and processor of an informational system for a mobility vehicle and configured to cause, when executed, the automotive storage and processor to become configured to implement the informational system for a mobility vehicle of claim 1.

* * * * *